United States Patent
Hsu et al.

(10) Patent No.: US 11,841,496 B2
(45) Date of Patent: Dec. 12, 2023

(54) OPTICAL PROCESSING TURNTABLE, WAVELENGTH CONVERSION MODULE AND PROJECTION APPARATUS

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 415 days.

(21) Appl. No.: 17/317,851

(22) Filed: May 11, 2021

(65) Prior Publication Data

US 2021/0405345 A1 Dec. 30, 2021

(30) Foreign Application Priority Data

Jun. 29, 2020 (CN) .......................... 202010606463.8

(51) Int. Cl.
*G02B 26/00* (2006.01)
*G03B 21/20* (2006.01)

(52) U.S. Cl.
CPC ......... *G02B 26/008* (2013.01); *G03B 21/204* (2013.01)

(58) Field of Classification Search
CPC .... G02B 23/008; G03B 21/204; G03B 21/20; G01B 26/00; H04N 9/31
See application file for complete search history.

(56) References Cited

U.S. PATENT DOCUMENTS

| 4,874,976 A | 10/1989 | Ohsawa et al. |
| 2005/0041221 A1 | 2/2005 | Buroni |
| 2017/0123201 A1* | 5/2017 | Adema ..................... F21V 9/45 |
| 2017/0180686 A1* | 6/2017 | Chen .................... G02B 26/008 |
| 2017/0269461 A1* | 9/2017 | Ikeda ................... G02B 26/008 |

FOREIGN PATENT DOCUMENTS

| CN | 102722014 | 10/2012 |
| CN | 102736207 | 10/2012 |
| CN | 103070016 | 5/2013 |
| CN | 203463553 | 3/2014 |
| CN | 209624967 | 11/2019 |
| CN | 210573159 | 5/2020 |
| TW | 201525604 | 7/2015 |
| TW | 201632978 | 9/2016 |

OTHER PUBLICATIONS

"Office Action of China Counterpart Application", dated Oct. 18, 2022, p. 1-p. 7.

* cited by examiner

*Primary Examiner* — Anne M Hines

(74) *Attorney, Agent, or Firm* — JCIPRNET

(57) ABSTRACT

An optical processing turntable, a wavelength conversion module, and a projection apparatus are provided. The optical processing turntable includes a substrate and a driver assembly. The substrate has a fixing hole and a first side and a second side opposite to each other. The driver assembly passes through the fixing hole to be disposed on the substrate to drive the substrate to rotate. The driver assembly has two locking surfaces, where the two locking surfaces are respectively located on the first side and the second side of the substrate. In the projection apparatus using the optical processing turntable provided by the invention, noise generated by structural vibration may be effectively reduced, and a prolonged service life is provided.

20 Claims, 21 Drawing Sheets

OPTICAL PROCESSING TURNTABLE, WAVELENGTH CONVERSION MODULE AND PROJECTION APPARATUS

CROSS-REFERENCE TO RELATED APPLICATION

This application claims the priority benefit of China application serial no. 202010606463.8, filed on Jun. 29, 2020. The entirety of the above-mentioned patent application is hereby incorporated by reference herein and made a part of this specification.

BACKGROUND OF THE INVENTION

1. Field of the Invention

The invention relates to a turntable, an optical module, and a projection apparatus, and in particular, to an optical processing turntable, a wavelength conversion module, a projector with the optical processing turntable, and a projector with the wavelength conversion module.

2. Description of Related Art

At present, a common wavelength conversion module, such as a fluorescent wheel, is fixed in an optical machine by using a locking surface, and the locking surface is located on one side of a stator of a driver. Because the locking surface is not designed at a center of the fluorescent wheel, vibration and noise are generated due to structure unbalance of the fluorescent wheel during operation. In addition, a fluorescent layer of the fluorescent wheel is disposed on the other side relative to the locking surface, causing the locking surface of the fluorescent wheel to bear an arm of force with a considerable distance. As such, service lives of the driver and the fluorescent wheel are affected. In addition, in another common fluorescent wheel, a balance-corrected metal ring is only provided on one side of the fluorescent wheel, and the fluorescent layer is also located on that side. Such design further causes the structure unbalance of the fluorescent wheel, thus causing vibration and noise during operation of the fluorescent. As such, the service lives of the driver and the fluorescent wheel are affected. Therefore, how to resolve the foregoing vibration and noise problems of the fluorescent wheel and prolong the service lives is an important issue.

The information disclosed in this BACKGROUND OF THE INVENTION section is only for enhancement of understanding of the background of the described technology and therefore it may contain information that does not form the prior art that is already known to a person of ordinary skill in the art. Further, the information disclosed in the BACKGROUND OF THE INVENTION section does not mean that one or more problems to be resolved by one or more embodiments of the invention were acknowledged by a person of ordinary skill in the art.

SUMMARY OF THE INVENTION

The invention provides an optical processing turntable where locking surfaces of a driver assembly of the optical processing turntable are respectively located on two opposite sides of a substrate to adjust a center of mass of the optical processing turntable, such that dynamic balance is enhanced.

The invention further provides a wavelength conversion module having two adjustment rings respectively located on two opposite sides of the substrate to adjust a center of mass of the wavelength conversion module, such that dynamic balance is enhanced.

The invention further provides a projection apparatus including the foregoing optical processing turntable to effectively reduce noise generated by structural vibration.

The invention further provides a projection apparatus including the foregoing wavelength conversion module to effectively reduce the noise generated by structural vibration.

Other objectives and advantages of the invention may be further known from technical features disclosed in the invention.

In order to achieve one or a part or all of the foregoing purposes or other purposes, an embodiment of the invention provides an optical processing turntable including a substrate and a driver assembly. The substrate has a fixing hole and a first side and a second side opposite to each other. The driver assembly passes through the fixing hole to be disposed on the substrate, to drive the substrate to rotate. The driver assembly has two locking surfaces, where the two locking surfaces are respectively located on the first side and the second side of the substrate.

In order to achieve one or a part or all of the foregoing purposes or other purposes, an embodiment of the invention provides a wavelength conversion module, where the wavelength conversion module includes a substrate, a first wavelength conversion layer, a second wavelength conversion layer, a first adjustment ring, a second adjustment ring, and a driver assembly. The substrate has a fixing hole and a first side and a second side opposite to each other. The first wavelength conversion layer is disposed on the first side of the substrate. The second wavelength conversion layer is disposed on the second side of the substrate. The first adjustment ring is disposed on the first side of the substrate. The second adjustment ring is disposed on the second side of the substrate. The driver assembly passes through the fixing hole to be disposed on the substrate, to drive the substrate to rotate. The driver assembly has a locking surface, and the locking surface is located on the second side of the substrate.

In order to achieve one or a part or all of the foregoing purposes or other purposes, an embodiment of the invention provides a projection apparatus including a light source module, an optical processing turntable, a light valve, and a projection lens. The light source module is configured to emit a light beam. The optical processing turntable is disposed on a transmission path of the light beam. The optical processing turntable includes a substrate and a driver assembly. The substrate has a fixing hole and a first side and a second side opposite to each other. The driver assembly passes through the fixing hole to be disposed on the substrate, to drive the substrate to rotate. The driver assembly has two locking surfaces, where the two locking surfaces are respectively located on the first side and the second side of the substrate. The light valve is disposed on a transmission path of the light beam and configured to convert the light beam into an image beam. The projection lens is disposed on a transmission path of the image beam and configured to convert the image beam into a projection beam.

In order to achieve one or a part or all of the foregoing purposes or other purposes, an embodiment of the invention provides a projection apparatus including a light source module, a wavelength conversion module, a light valve, and a projection lens. The light source module is configured to emit a light beam. The wavelength conversion module is disposed on a transmission path of the light beam. The wavelength conversion module includes a substrate, a first wavelength conversion layer, a second wavelength conversion layer, a first adjustment ring, a second adjustment ring, and a driver assembly. The substrate has a fixing hole and a first side and a second side opposite to each other. The first wavelength conversion layer is disposed on the first side of the substrate. The second wavelength conversion layer is disposed on the second side of the substrate. The first adjustment ring is disposed on the first side of the substrate. The second adjustment ring is disposed on the second side of the substrate. The driver assembly passes through the fixing hole to be disposed on the substrate, to drive the substrate to rotate. The driver assembly has a locking surface, and the locking surface is located on the second side of the substrate. The light valve is disposed on a transmission path of the light beam and configured to convert the light beam into an image beam. The projection lens is disposed on a transmission path of the image beam and configured to convert the image beam into a projection beam.

Based on the foregoing, the embodiments of the invention have at least one of the following advantages or effects. In the optical processing turntable of the invention, the two locking surfaces of the driver assembly are respectively located on the first side and the second side of the substrate opposite to each other, so that the center of mass of the optical processing turntable is located between the two locking surfaces, thereby achieving structure balance and dynamic balance. Therefore, when the optical processing turntable is in operation, vibration and noise may be effectively reduced due to the dynamic balance, and the service life of the driver assembly may further be improved. In this way, in the projection apparatus using the optical processing turntable provided by the invention, noise generated by structural vibration may be effectively reduced, and a prolonged service life is provided.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
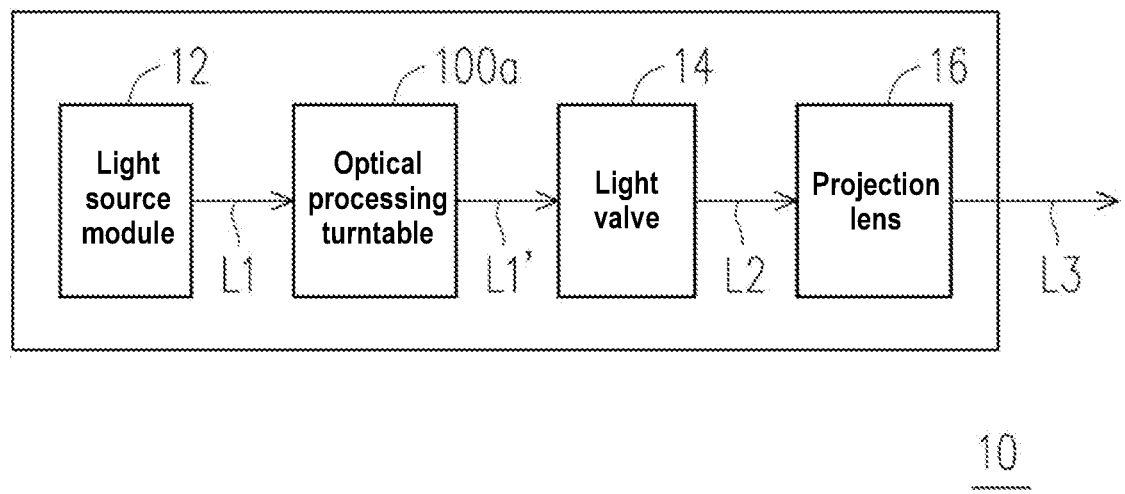
FIG. 1 is a schematic view of a projection apparatus according to an embodiment of the invention.

FIG. 1 is a schematic view of a projection apparatus according to an embodiment of the invention. Referring to FIG. 1, in the present embodiment, a projection apparatus 10 includes a light source module 12, an optical processing turntable 100a, a light valve 14, and a projection lens 16. The light source module 12 is configured to emit a light beam L1. The optical processing turntable 100a may be, for example, a wavelength conversion module (such as a phosphor wheel), a color filter wheel, or a diffusion wheel, and is disposed on a transmission path of the light beam L1. The light beam L1 may be converted, by the optical processing turntable 100a, into an illumination beam L1'. The light valve 14 is disposed on a transmission path of the illumination beam L1', and configured to convert the illumination beam L1' into an image beam L2. The projection lens 16 is disposed on a transmission path of the image beam L2 and configured to convert the image beam L2 into a projection beam L3.

Further, the light source module 12 used in the present embodiment is, for example, a laser diode (LD) such as a laser diode array or a light emitting diode (LED). In detail, a light source meeting volume requirement in actual design may be implemented, and the embodiment is not limited thereto. The light valve 14 is, for example, a reflective light modulator such as a liquid crystal on silicon panel (LCoS panel) or a digital micro-mirror device (DMD). In an embodiment, the light valve 14 is, for example, transmissive light modulator such as a transparent liquid crystal panel, an electro-optical modulator, a magneto-optical modulator, or an acousto-optic modulator (AOM), but a form and a type of the light valve 14 are not limited in the embodiment. For detailed steps and an implementation of a method for converting the illumination beam L1' into the image beam L2 by the light valve 14, adequate instructions, advices, and implementation descriptions may be obtained from general knowledge in the art, and the descriptions thereof are omitted herein. In addition, the projection lens 16 includes, for example, a combination of one or more optical lenses having a diopter, and includes, for example, various combinations of non-planar lenses such as biconcave lenses, biconvex lenses, concave-convex lenses, convex-concave lenses, plano-convex lenses, and plano-concave lenses. In an embodiment, the projection lens 16 may further include a flat optical lens that converts the image beam L2 from the light valve 14 into a projection light beam L3 through reflection or penetration and projects the image frame out of the projection apparatus 10. Herein, a form and a type of the projection lens 16 are not limited in the embodiment.

Figure 2A:
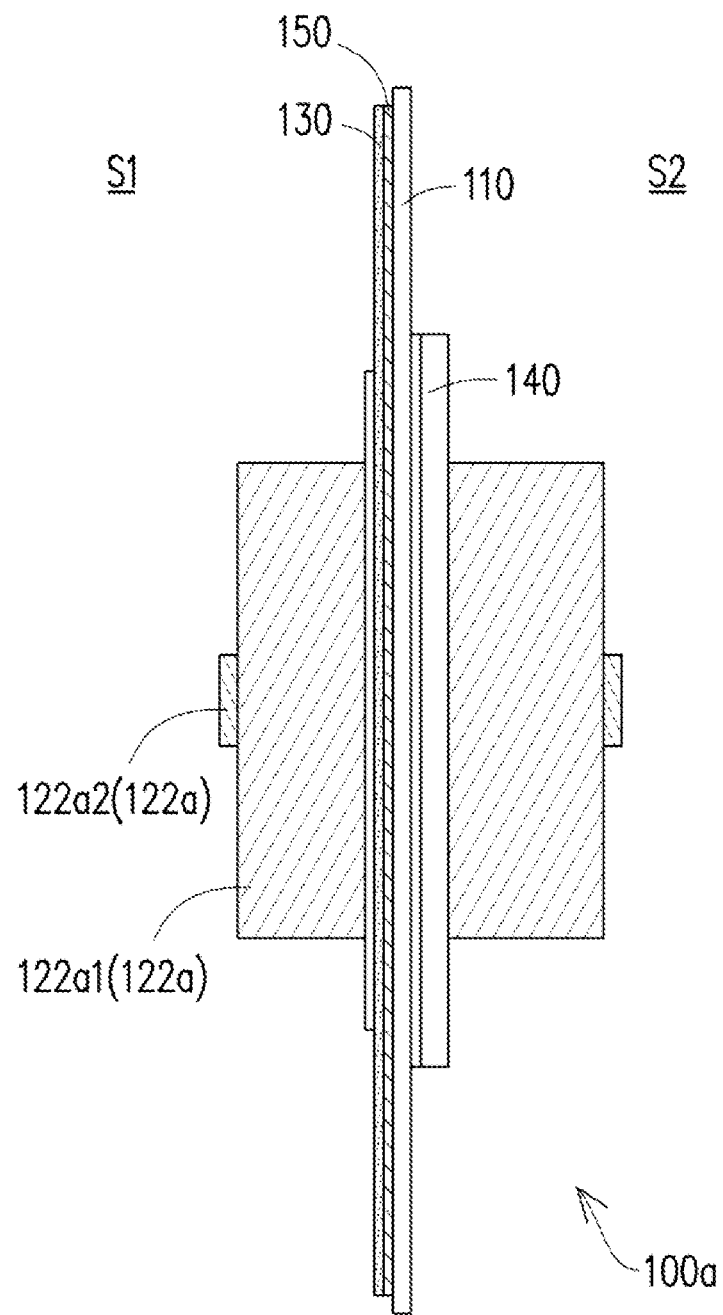
FIG. 2A is a schematic side view of an optical processing turntable of FIG. 1.
Figure 2B:
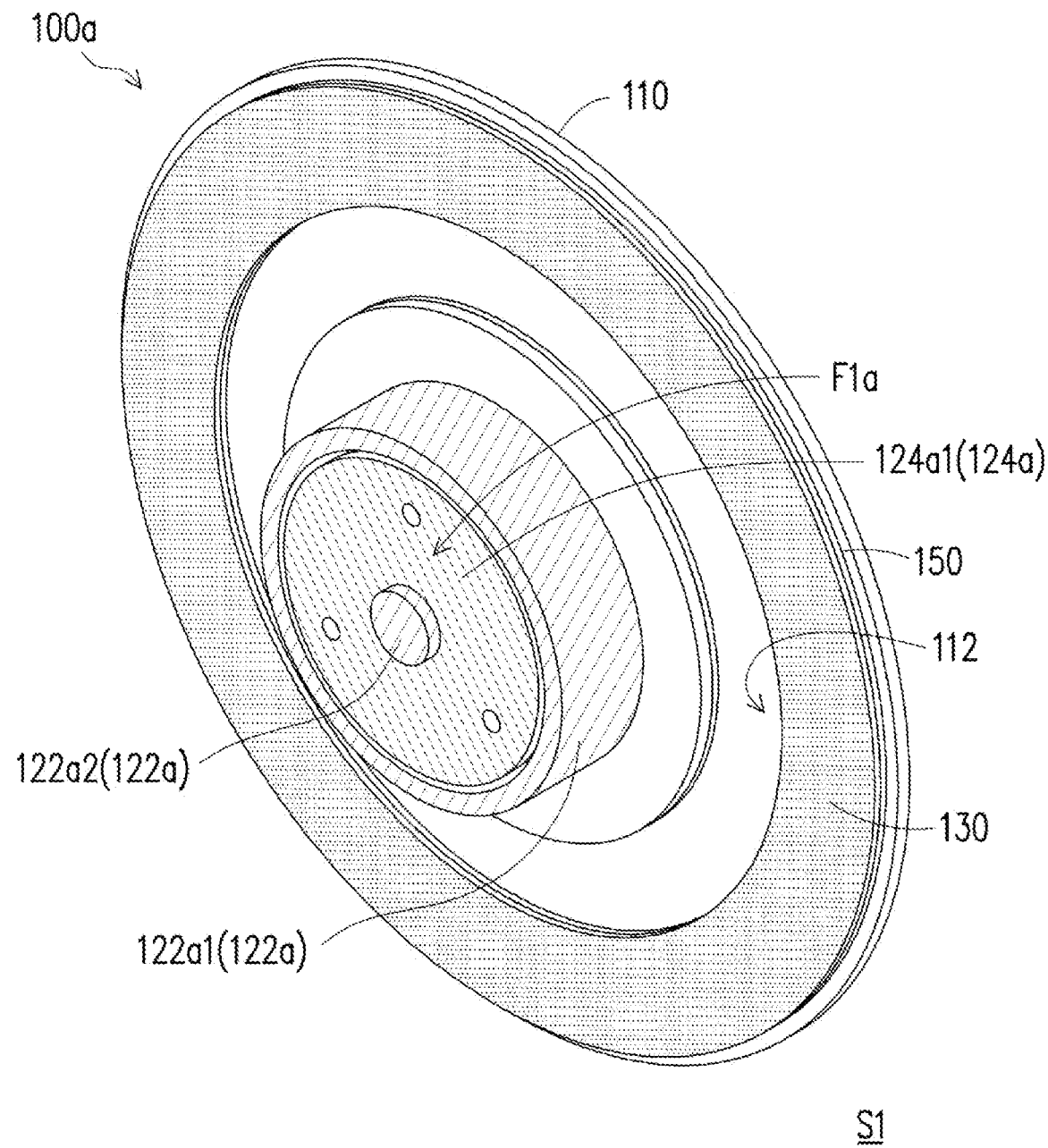
FIG. 2B is a schematic three-dimensional view of the optical processing turntable of FIG. 2A from one perspective.
Figure 2C:
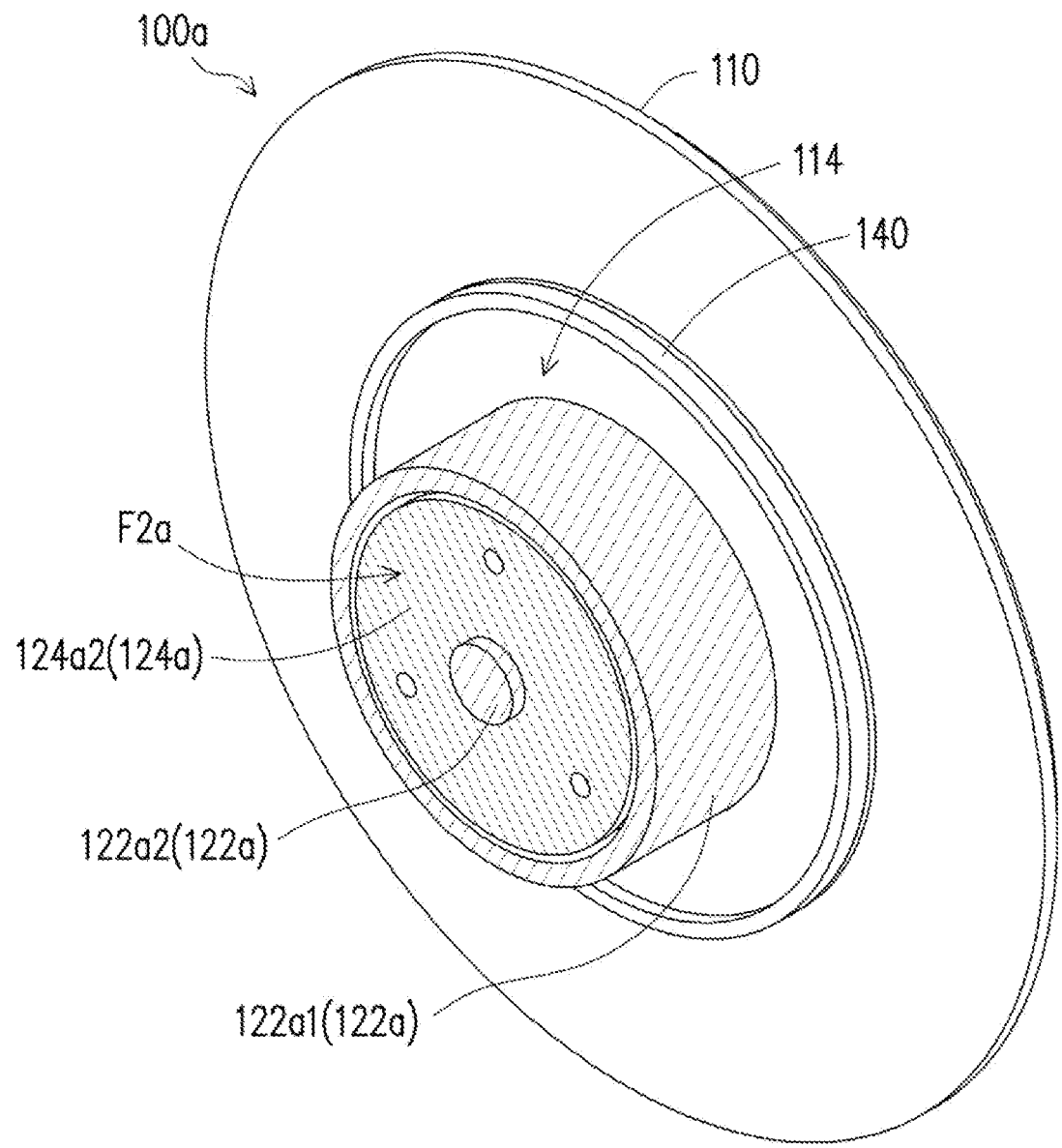
FIG. 2C is a schematic three-dimensional view of the optical processing turntable of FIG. 2A from another perspective.
Figure 2D:
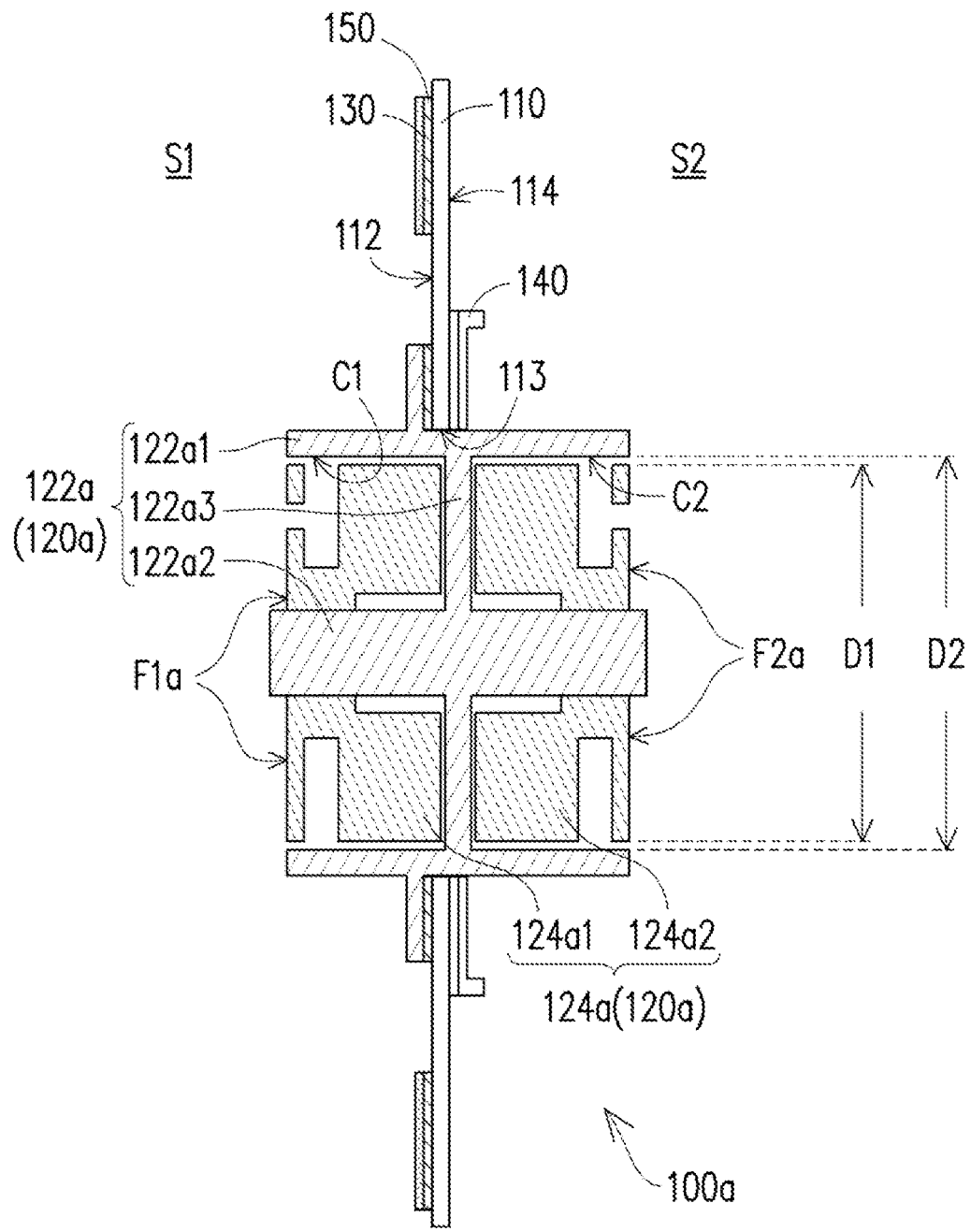
FIG. 2D is a schematic cross-sectional view of the optical processing turntable of FIG. 2A.

FIG. 2A is a schematic side view of an optical processing turntable of FIG. 1. FIG. 2B is a schematic three-dimensional view of the optical processing turntable of FIG. 2A from one perspective. FIG. 2C is a schematic three-dimensional view of the optical processing turntable of FIG. 2A from another perspective. FIG. 2D is a schematic cross-sectional view of the optical processing turntable of FIG. 2A.

Referring to FIG. 2A, FIG. 2B, FIG. 2C, and FIG. 2D together, in the embodiment, an optical processing turntable 100a includes a substrate 110 and a driver assembly 120a. The substrate 110 has a fixing hole 113 and a first side S1 and a second side S2 opposite to each other. The driver assembly 120a passes through the fixing hole 113 to be disposed on the substrate 110, to drive the substrate 110 to rotate. The driver assembly 120a has two locking surfaces F1a and F2a. The two locking surfaces F1a and F2a are respectively located on the first side S1 and the second side S2 of the substrate 110.

In detail, the driver assembly 120a of the embodiment includes a rotor 122a and a stator 124a. The rotor 122a includes a shaft sleeve 122a1, a pivot 122a2, and a partition plate 122a3. The partition plate 122a3 divides the shaft sleeve 122a1 into two accommodating regions C1 and C2 in a direction parallel to the substrate 110, and the pivot 122a2 penetrates through the partition plate 122a3 from the first side S1 to the second side S2 and is located in the shaft sleeve 122a1. The stator 124a includes two stator portions 124a1 and 124a2. The two stator portions 124a1 and 124a2 respectively have two locking surfaces F1a and F2a and are respectively disposed in the two accommodating regions C1 and C2. The two locking surfaces F1a and F2a are adjacent to two opposite ends of the shaft sleeve 122a1. The two locking surfaces F1a and F2a are located in the shaft sleeve 122a1 and have a same outer diameter D1. The outer diameter D1 is less than or equal to an inner diameter D2 of the shaft sleeve 122a1.

In addition, in the embodiment, the substrate 110 is, for example, a phosphor wheel substrate. Therefore, the optical processing turntable 100 of the embodiment further includes a wavelength conversion layer 130. The substrate 110 has a first surface 112 and a second surface 114 opposite to each other. The wavelength conversion layer 130 is disposed on the first side S1 of the substrate 110 and located on the first surface 112. In other embodiments, the substrate 110 may be, for example, a color filter wheel substrate or a diffusion wheel substrate, which is not limited herein. Herein, a material of the substrate 110 is, for example, metal or ceramic, and an outer diameter of the substrate 110 may be, for example, 67 mm, and a thickness of the substrate 110 may be, for example, 0.7 mm, but the invention is not limited thereto.

In addition, the optical processing turntable 100a of the embodiment further includes an adjustment ring 140 disposed on the second side S2 of the substrate 110 and located on the second surface 114. A shape of the adjustment ring 140 of the embodiment is a hollow ring shape and is coaxial with an axis of the driver assembly 120a. Herein, a material of the adjustment ring 140 is, for example, metal, plastic, ceramic, or a composite material, which is not limited herein. Moreover, the optical processing turntable 100a of the embodiment further includes a reflective layer 150. The reflective layer 150 is disposed between the substrate 110 and the wavelength conversion layer 130.

Because the two locking surfaces F1a and F2a of the driver assembly 120a of the embodiment are respectively located on the first side S1 and the second side S2 of the substrate 110, a structure thereof is symmetrically designed. Therefore, a center of mass of the optical processing turntable 100a of the embodiment may be located between the two locking surfaces F1a and F2a. When the optical processing turntable 100a is in operation, because two opposite ends of the optical processing turntable 100a may be locked to an optical machine (not shown), vibration and noise generated during the operation of the optical processing turntable 100a may be reduced, thereby improving a service life of the driver assembly 120a. After simulation, it is known that axial vibration of the optical processing turntable 100a of the embodiment may be reduced to less than 20 mg. In short, the optical processing turntable 100a of the embodiment adjusts an overall center of mass by using symmetrical or substantially symmetrical structures disposed on two opposite sides of the substrate 110, thereby achieving structural balance and improving dynamic balance.

It should be noted herein that the element symbols and partial content of the foregoing embodiments are still used in the following embodiments, where same symbols are used to indicate same or similar elements, and description of same technical content is omitted. For description of the omitted part, reference may be made to the foregoing embodiments, and details are not described again in the following embodiments.

Figure 3A:
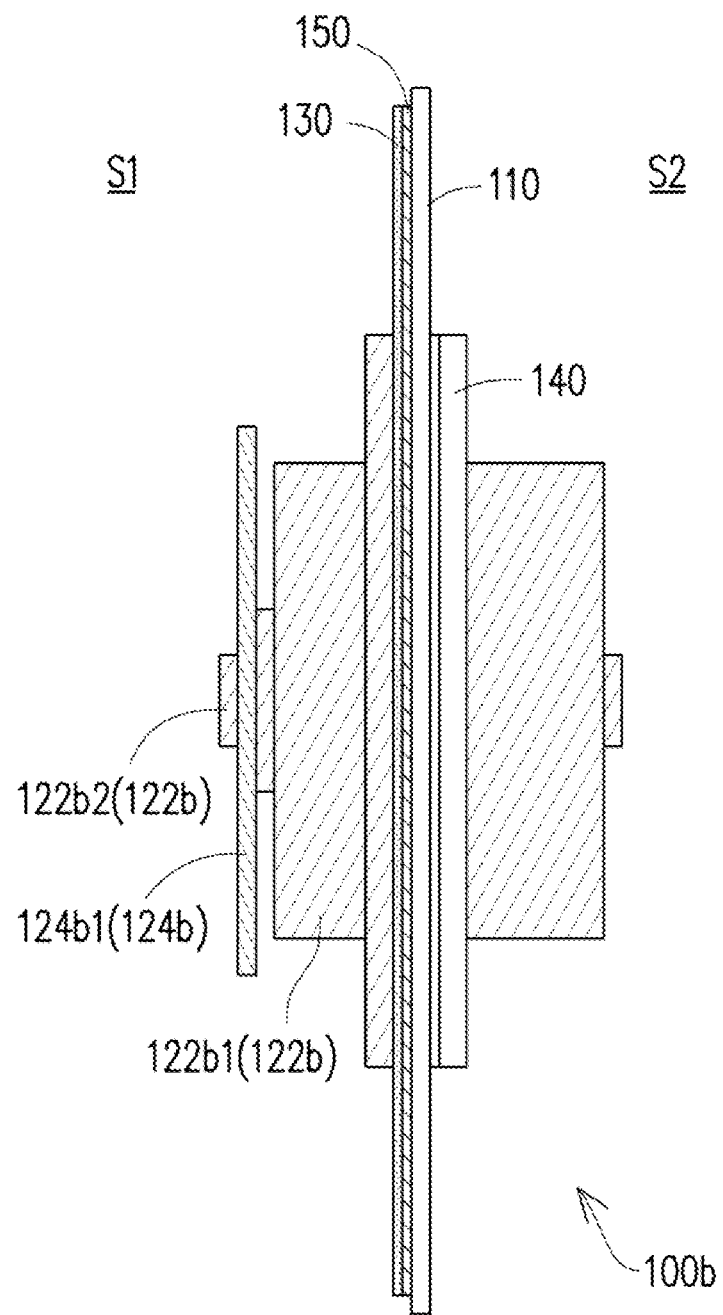
FIG. 3A is a schematic side view of an optical processing turntable according to another embodiment of the invention.
Figure 3B:
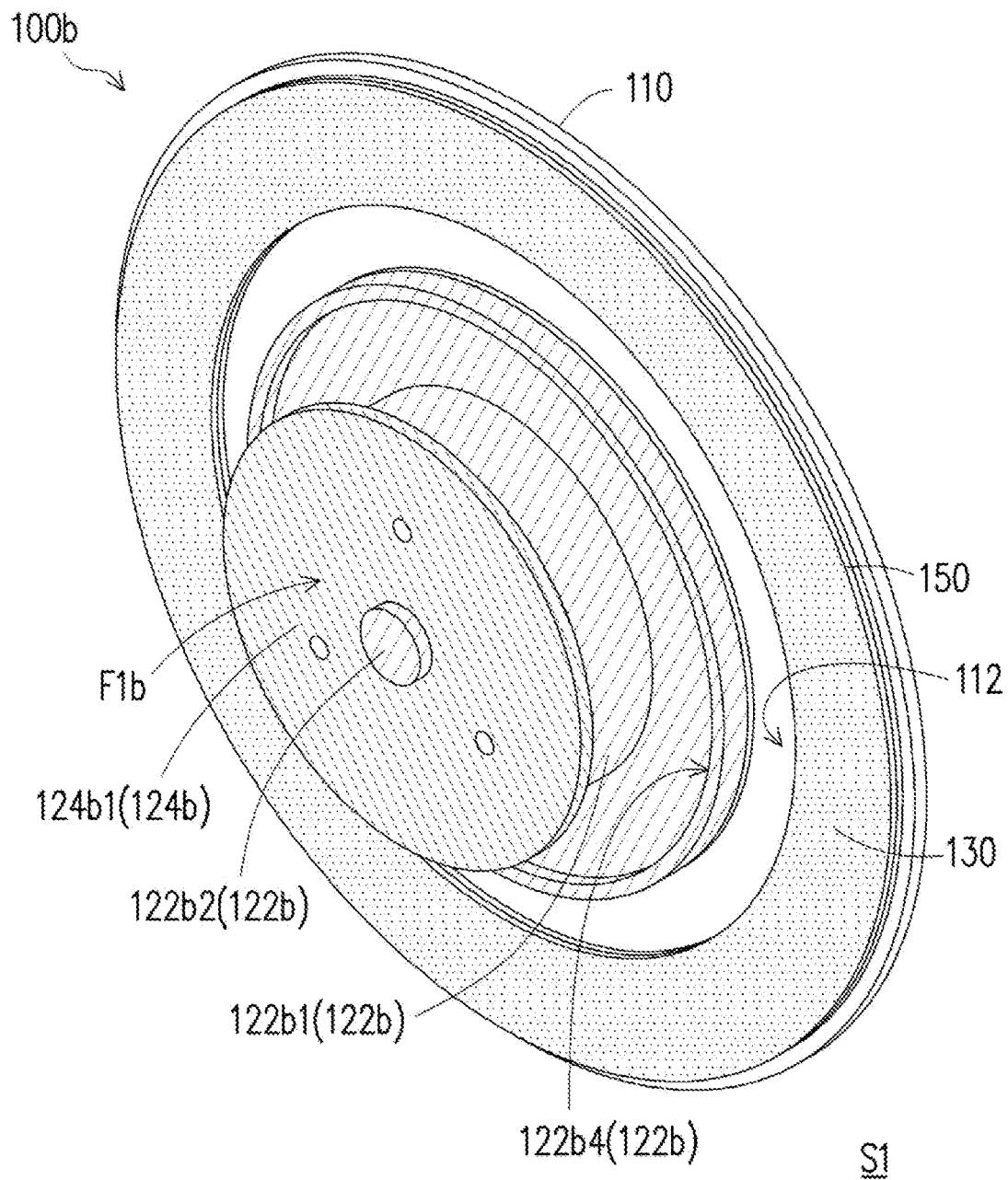
FIG. 3B is a schematic three-dimensional view of the optical processing turntable of FIG. 3A from one perspective.
Figure 3C:
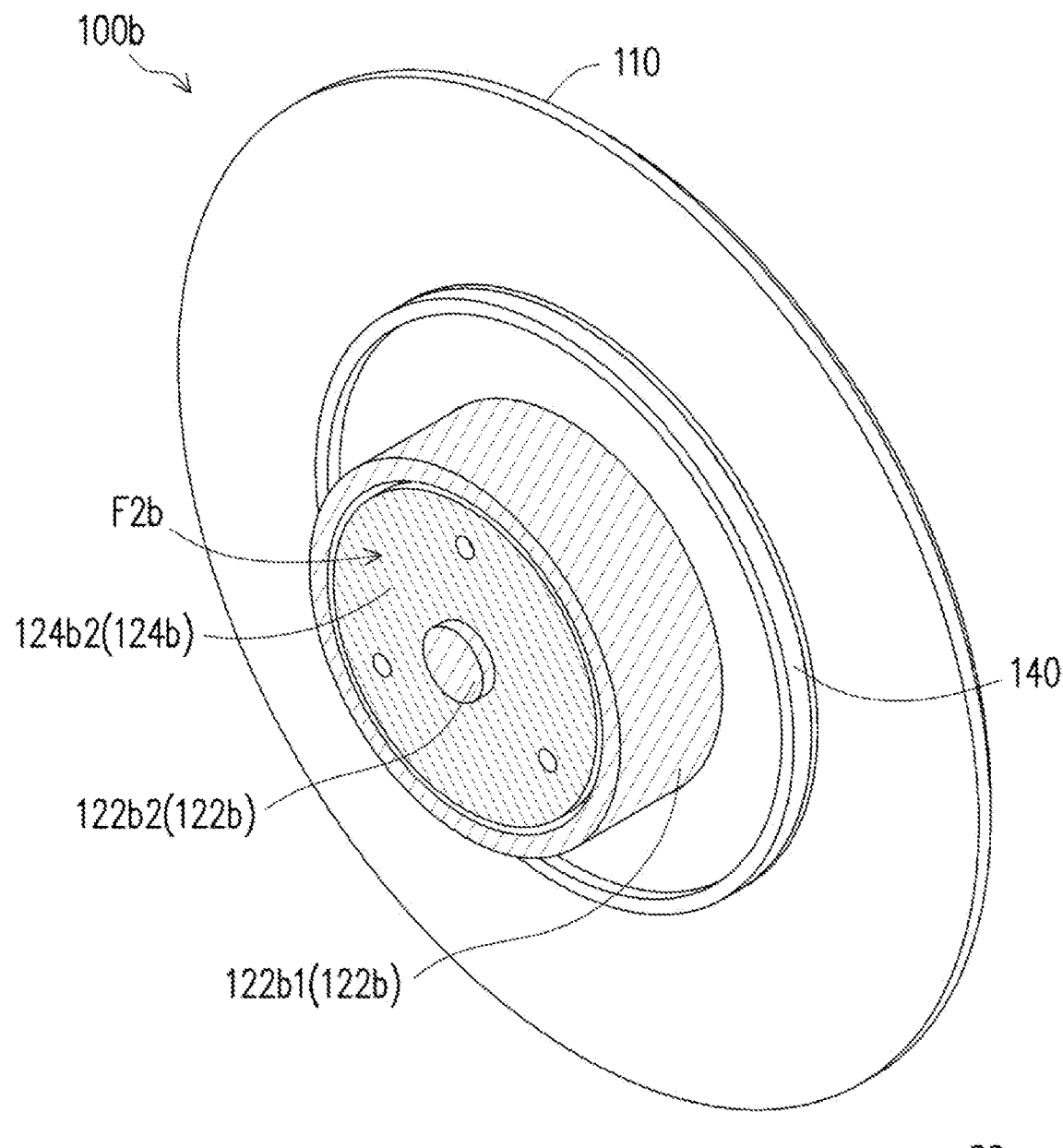
FIG. 3C is a schematic three-dimensional view of the optical processing turntable of FIG. 3A from another perspective.
Figure 3D:
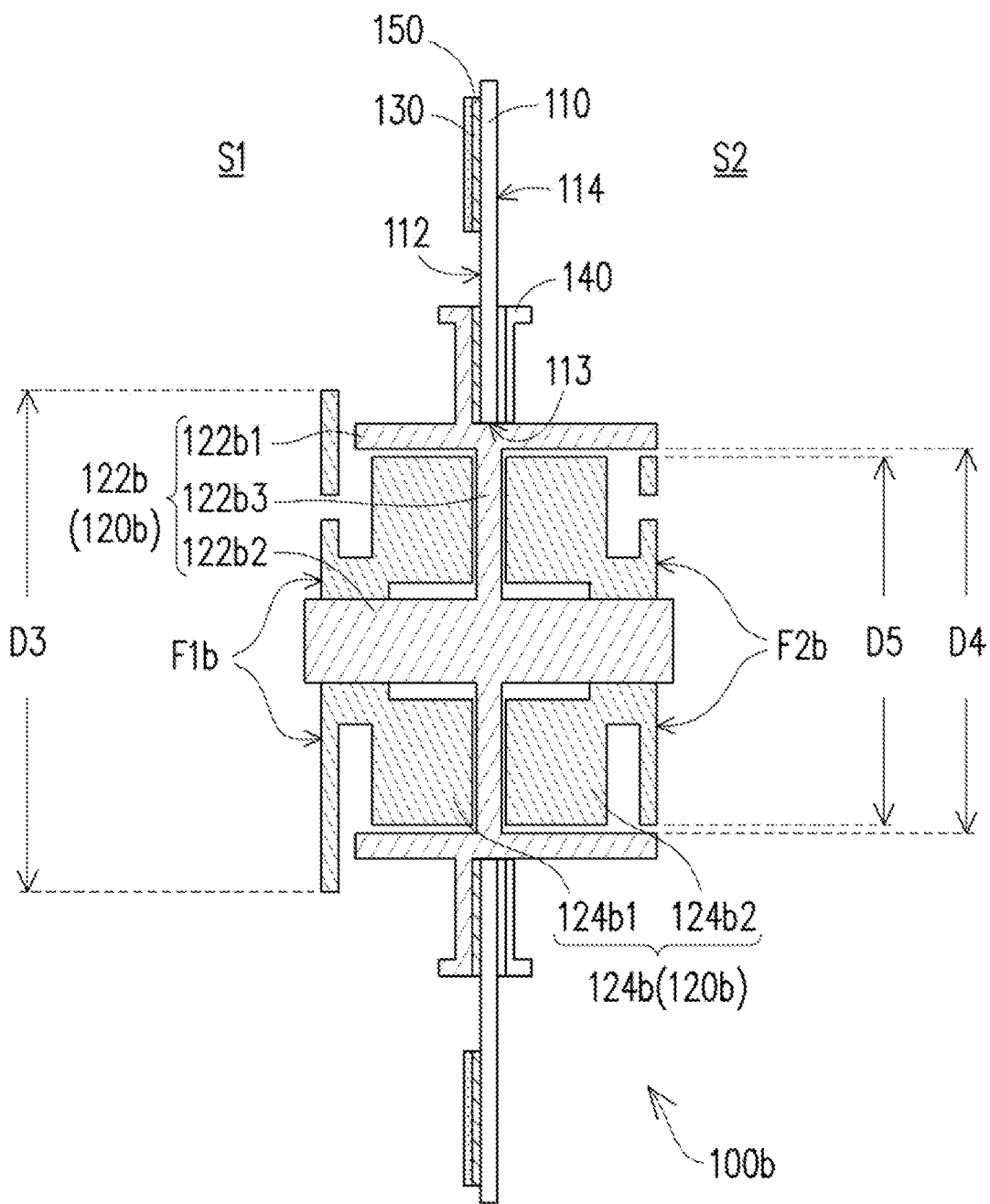
FIG. 3D is a schematic cross-sectional view of the optical processing turntable of FIG. 3A.

FIG. 3A is a schematic side view of an optical processing turntable according to another embodiment of the invention. FIG. 3B is a schematic three-dimensional view of the optical processing turntable of FIG. 3A from one perspective. FIG. 3C is a schematic three-dimensional view of the optical processing turntable of FIG. 3A from another perspective. FIG. 3D is a schematic cross-sectional view of the optical processing turntable of FIG. 3A.

Referring to both FIG. 2D and FIG. 3D, an optical processing turntable 100b of the embodiment is similar to the optical processing turntable 100a of FIG. 2D, and a difference between the two optical processing turntables is that: a driver assembly 120b of the embodiment includes a rotor 122b and a stator 124b. The rotor 122b includes a shaft sleeve 122b1, a pivot 122b2, and a partition plate 122b3. The stator 124b includes two stator portions 124b1 and 124b2, and the two stator portions 124b1 and 124b2 respectively have a first locking surface F1b disposed on a first side S1 of a substrate 110 and a second locking surface F2b disposed on a second side S2 of the substrate 110. The first locking surface F1b is located outside a shaft sleeve 122b1 and has a first outer diameter D3. The second locking surface F2b is located in the shaft sleeve 122b1 and has a second outer diameter D5. In particular, the first outer diameter D3 is greater than an inner diameter D4 of the shaft sleeve 122b1, and the second outer diameter D5 is less than or equal to the inner diameter D4 of the shaft sleeve 122b1. In other words, in the embodiment, an area of the first locking surface F1b is larger than an area of the second locking surface F2b to be adapted to the needs of a practical application, such as adjustment of a center of mass of the optical processing turntable 100b, locking in different optical-mechanical mechanisms, and reduction of resonance simulation in combination with an optical-mechanical assembly mechanism, etc.

For example, if an adjustment ring 140 located on the second side S2 of the substrate 110 is made of a heavy metal material, weight on the first side S1 of the substrate 110 may be slightly less than weight on the second side S2 thereof. In this case, when an area of the first locking surface F1b is larger than the area of the second locking surface F2b, a center of mass of the optical processing turntable 100b is away from the center of the optical processing turntable 100b, thereby lengthening an arm of force and achieving structural balance and dynamic balance. In other embodiments not shown, the structural balance and dynamic balance of the optical processing turntable may further be achieved by changing shapes of the first locking surface and the second locking surface.

In addition, referring to FIG. 3A, FIG. 3B, and FIG. 3C together, the rotor 122b of the embodiment further includes a groove structure 122b4 disposed on the first side S1 of the substrate 110 and connected around the shaft sleeve 122b1. Herein, the groove structure 122b4 is located on a first surface 112 of the substrate 110, and the groove structure 122b4 may be filled with a balance substance (not shown) to achieve balance correction. In addition, the groove structure 122b4 may be designed to further achieve the structural balance between weight on the first side S1 of the substrate 110 and weight on the second side S2 of the substrate 110, so that structures on the two opposite sides of the substrate 110 are symmetrical or nearly symmetrical, so as to reduce the vibration and noise caused by structure unbalance during operation of the optical processing turntable 100b.

Figure 4A:
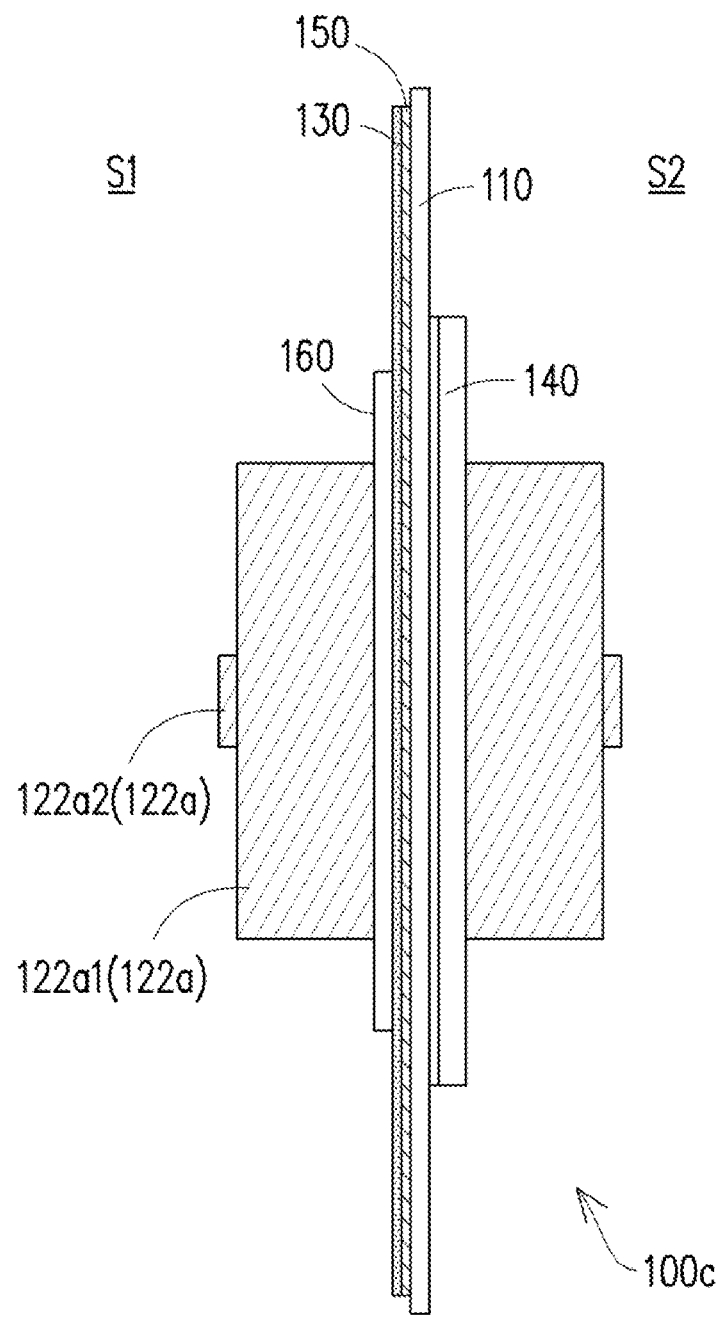
FIG. 4A is a schematic side view of an optical processing turntable according to yet another embodiment of the invention.
Figure 4B:
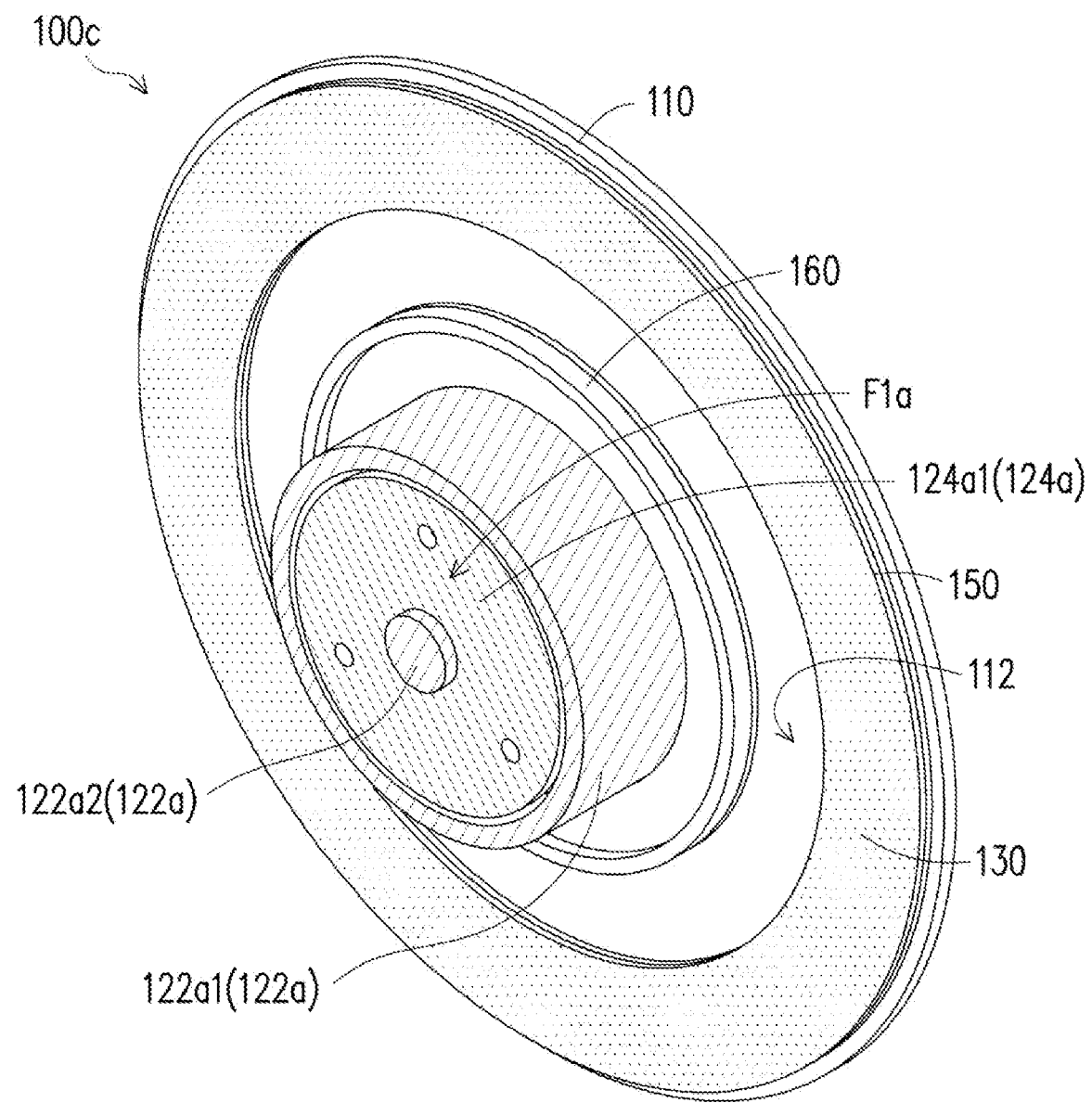
FIG. 4B is a schematic three-dimensional view of the optical processing turntable of FIG. 4A from one perspective.
Figure 4C:
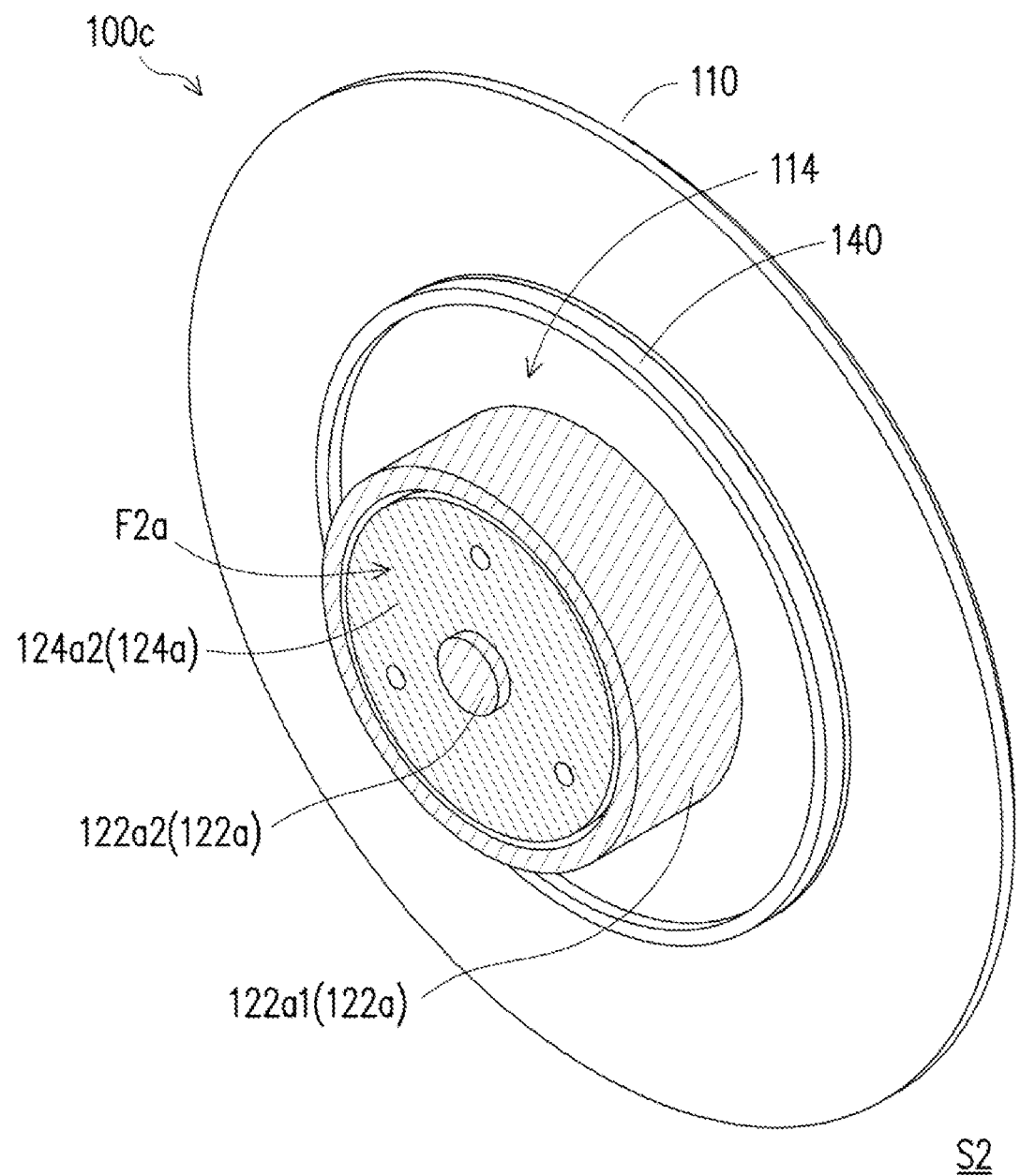
FIG. 4C is a schematic three-dimensional view of the optical processing turntable of FIG. 4A from another perspective.
Figure 4D:
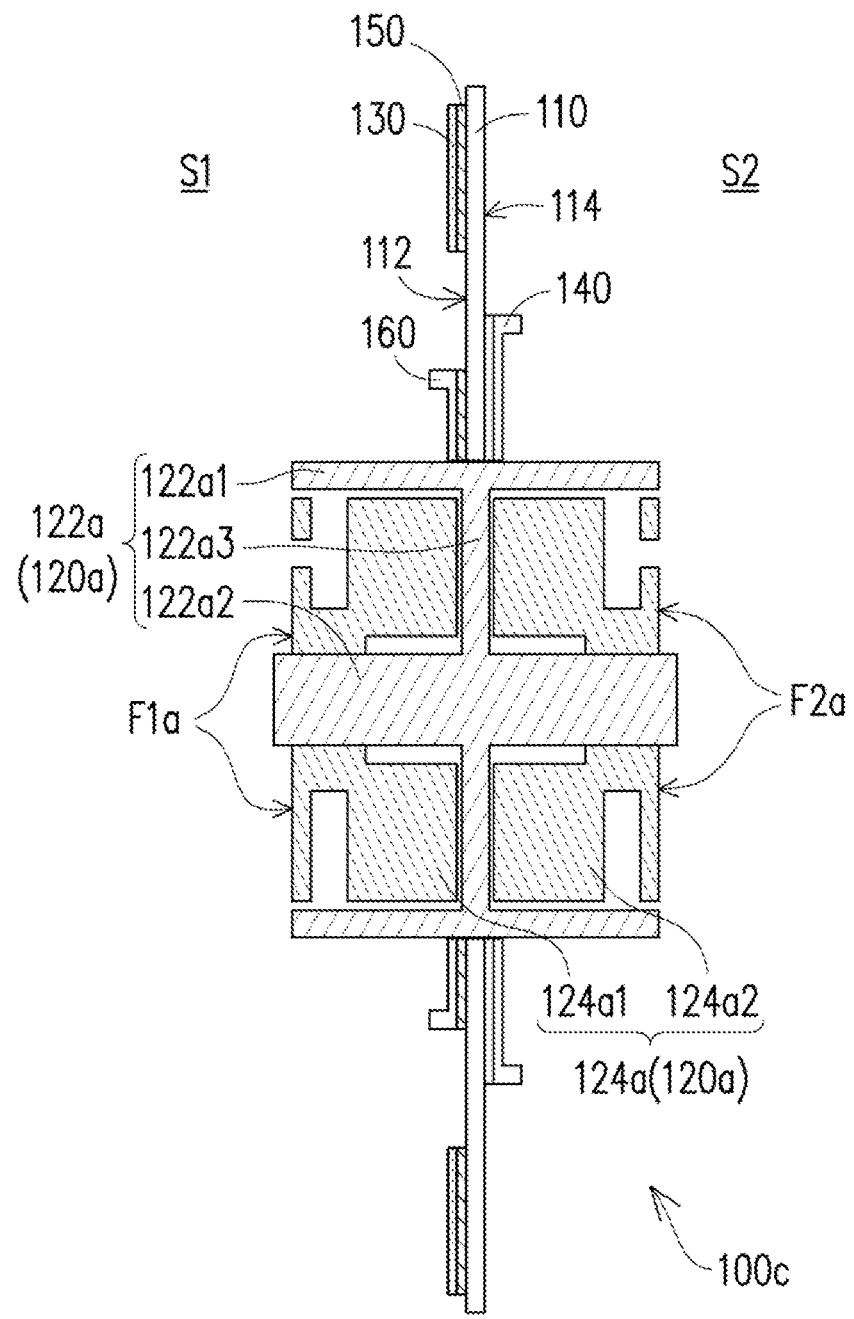
FIG. 4D is a schematic cross-sectional view of the optical processing turntable of FIG. 4A.

FIG. 4A is a schematic side view of an optical processing turntable according to yet another embodiment of the invention. FIG. 4B is a schematic three-dimensional view of the optical processing turntable of FIG. 4A from one perspective. FIG. 4C is a schematic three-dimensional view of the optical processing turntable of FIG. 4A from another perspective. FIG. 4D is a schematic cross-sectional view of the optical processing turntable of FIG. 4A.

Referring to both FIG. 2B and FIG. 4B, an optical processing turntable 100c of the embodiment is similar to the optical processing turntable 100a of FIG. 2B, and a difference between the two optical processing turntables is that: the optical processing turntable 100c of the embodiment further includes an auxiliary adjustment ring 160. The auxiliary adjustment ring 160 is disposed on a first side S1 of a substrate 110 and located on a first surface 112.

Further, referring to FIG. 4A, FIG. 4B, FIG. 4C, and FIG. 4D together, in the embodiment, an auxiliary adjustment ring 160 and an adjustment ring 140 are respectively disposed on the first side S1 and the second side S2 of the substrate 110. External dimensions of the adjustment ring 140 and the auxiliary adjustment ring 160 are different, but the invention is not limited thereto. In the embodiment, an outer diameter of the adjustment ring 140 is greater than an outer diameter of the auxiliary adjustment ring 160, and an orthographic projection of the auxiliary adjustment ring 160 on the substrate 110 completely overlaps an orthographic projection of the adjustment ring 140 on the substrate 110. In another embodiment, the external dimensions of the adjustment ring 140 and the auxiliary adjustment ring 160 may also be the same. In addition, weight of the adjustment ring 140 and weight of the auxiliary adjustment ring 160 may be the same or different, and may be adjusted according to design of actual structure balance of the optical processing turntable 100c.

In short, the adjustment ring 140 and the auxiliary adjustment ring 160 of the embodiment are disposed to fill a balance material to balance the structure of the optical processing turntable 100c, and to meet actual application demands through design of shapes or dimensions, etc. of the adjustment ring 140 and the auxiliary adjustment ring 160. For example, adjustment of a center of mass of the optical processing turntable 100c, locking in different optical-mechanical mechanisms, and cooperation with an optical-mechanical assembly mechanism to reduce resonance simulation, etc., so that vibration and noise caused by structural imbalance during operation of the optical processing turntable 100c may be simultaneously reduced.

Figure 5A:
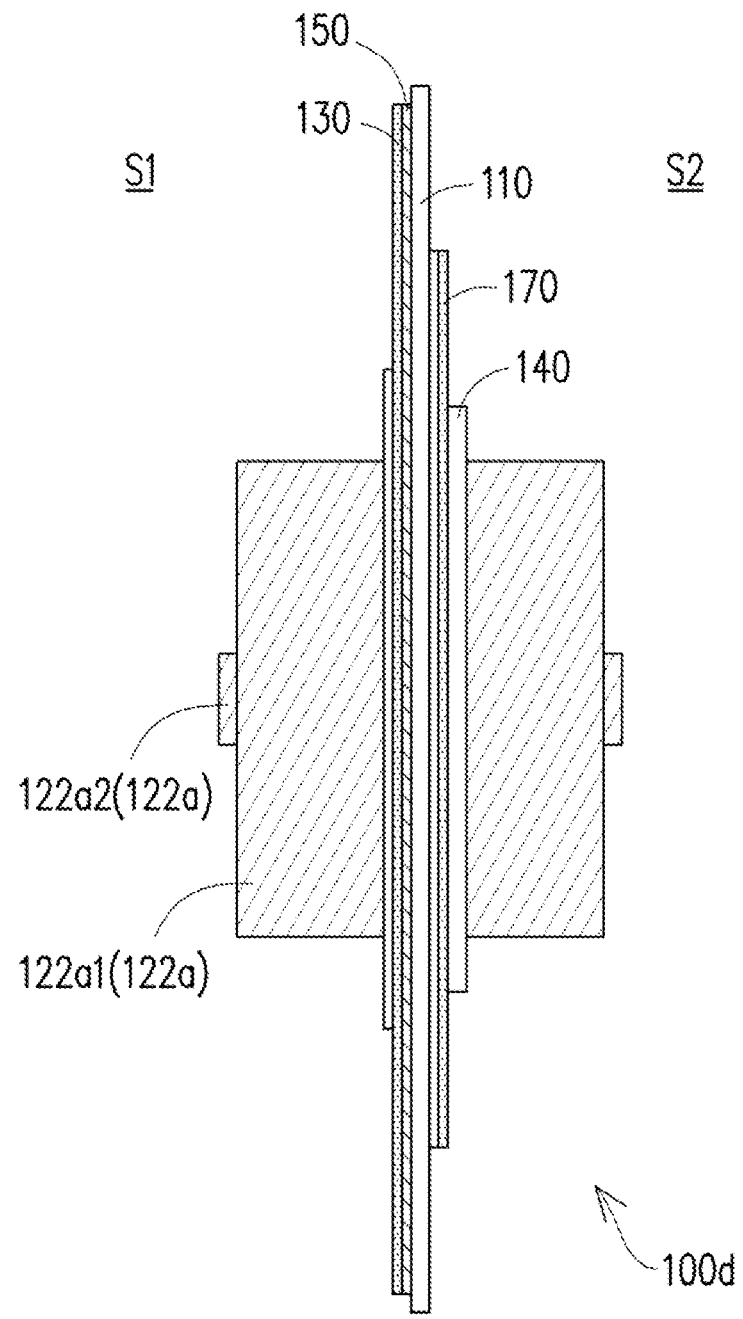
FIG. 5A is a schematic side view of an optical processing turntable according to still another embodiment of the invention.
Figure 5B:
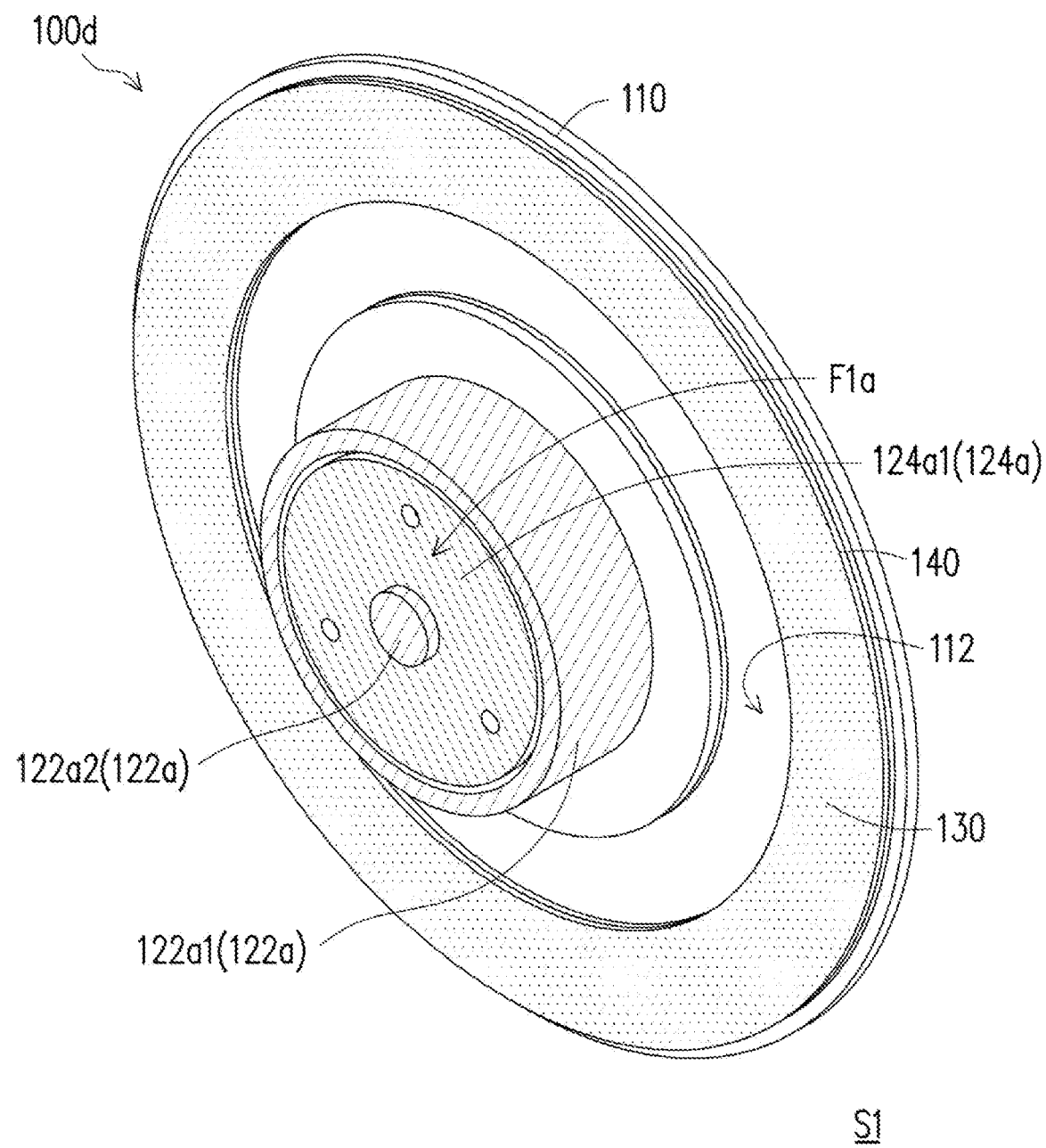
FIG. 5B is a schematic three-dimensional view of the optical processing turntable of FIG. 5A from one perspective.
Figure 5C:
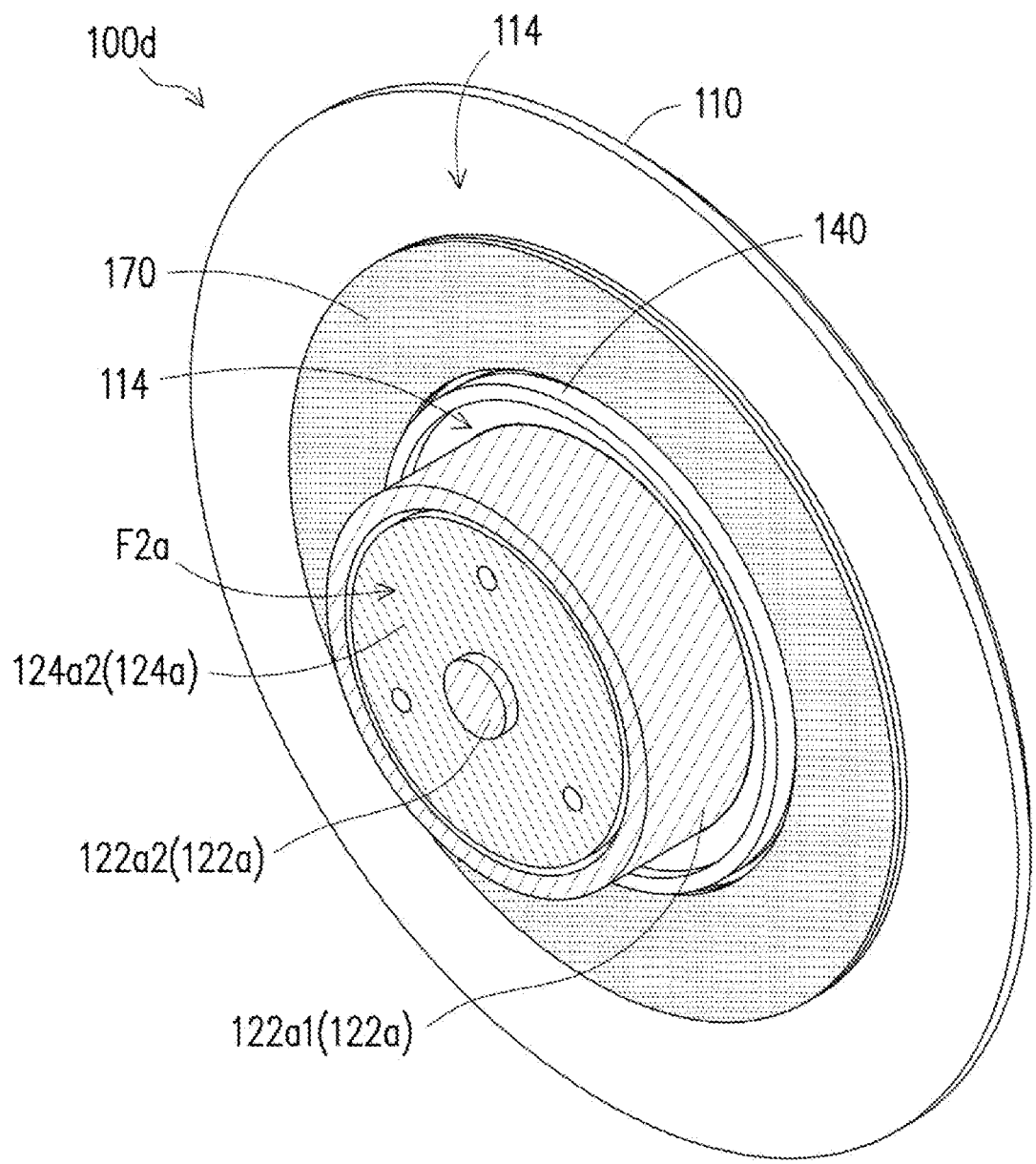
FIG. 5C is a schematic three-dimensional view of the optical processing turntable of FIG. 5A from another perspective.
Figure 5D:
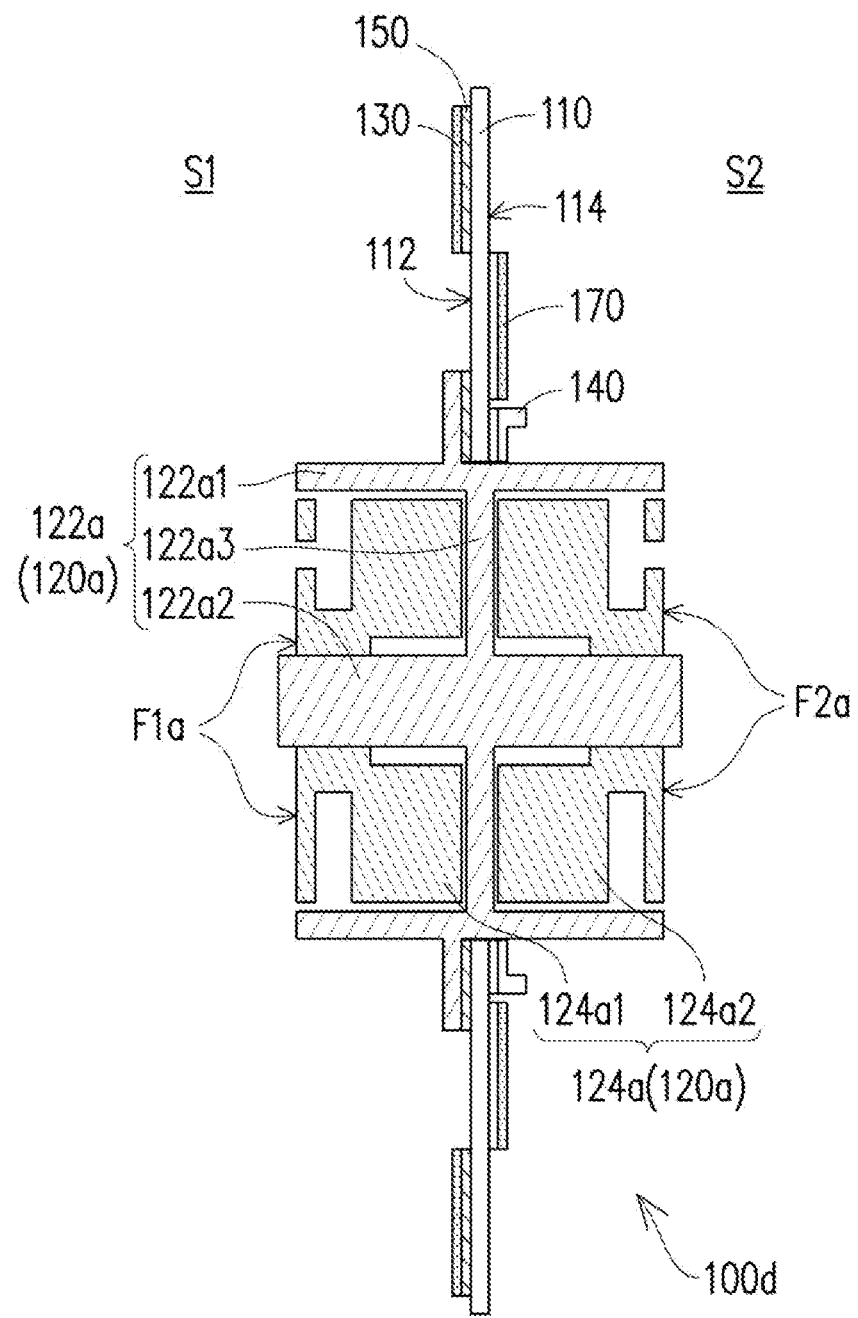
FIG. 5D is a schematic cross-sectional view of the optical processing turntable of FIG. 5A.

FIG. 5A is a schematic side view of an optical processing turntable according to still another embodiment of the invention. FIG. 5B is a schematic three-dimensional view of the optical processing turntable of FIG. 5A from one perspective. FIG. 5C is a schematic three-dimensional view of the optical processing turntable of FIG. 5A from another perspective. FIG. 5D is a schematic cross-sectional view of the optical processing turntable of FIG. 5A.

Referring to FIG. 2C and FIG. 5C together, an optical processing turntable 100d of the embodiment is similar to the optical processing turntable 100a of FIG. 2C, and a difference between the two optical processing turntables is that: the optical processing turntable 100d of the present embodiment further includes an auxiliary wavelength conversion layer 170. The auxiliary wavelength conversion layer 170 is disposed on a second side S2 of a substrate 110 and is located on a second surface 114. Herein, a wavelength conversion layer 130 and the auxiliary wavelength conversion layer 170 may have the same or different optical characteristics, and may generate excitation beams of the same or different wavelengths, which is not limited herein.

Further, referring to FIG. 5A, FIG. 5B, FIG. 5C, and FIG. 5D together, in the embodiment, the wavelength conversion layer 130 and the auxiliary wavelength conversion layer 170 are respectively disposed on a first side S1 and the second side S2 of the substrate 110. External dimensions of the wavelength conversion layer 130 and the auxiliary wavelength conversion layer 170 are different, but the invention is not limited thereto. In another embodiment, external dimensions of the wavelength conversion layer 130 and the auxiliary wavelength conversion layer 170 may be the same. Herein, an orthographic projection of the wavelength conversion layer 130 on the substrate 110 does not overlap an orthographic projection of the auxiliary wavelength conversion layer 170 on the substrate 110. In other embodiments not shown, the orthographic projection of the wavelength conversion layer 130 on the substrate 110 may further completely overlap or partially overlap the orthographic projection of the auxiliary wavelength conversion layer 170 on the substrate 110, and adjustment may be performed according to an actual structural balance status of the optical processing turntable 100d.

In short, the wavelength conversion layer 130 and the auxiliary wavelength conversion layer 170 of the embodiment are disposed to take both optical design and structural balance into consideration, and to meet actual application demands through design of shapes and dimensions, etc. of the wavelength conversion layer 130 and the auxiliary wavelength conversion layer 170, such as adjustment of a center of mass of the optical processing turntable 100d, locking in different optical-mechanical mechanisms, and cooperation with an optical-mechanical assembly mechanism to reduce resonance simulation, etc., so that vibration and noise caused by structural imbalance during operation of the optical processing turntable 100d may be simultaneously reduced.

Figure 6A:
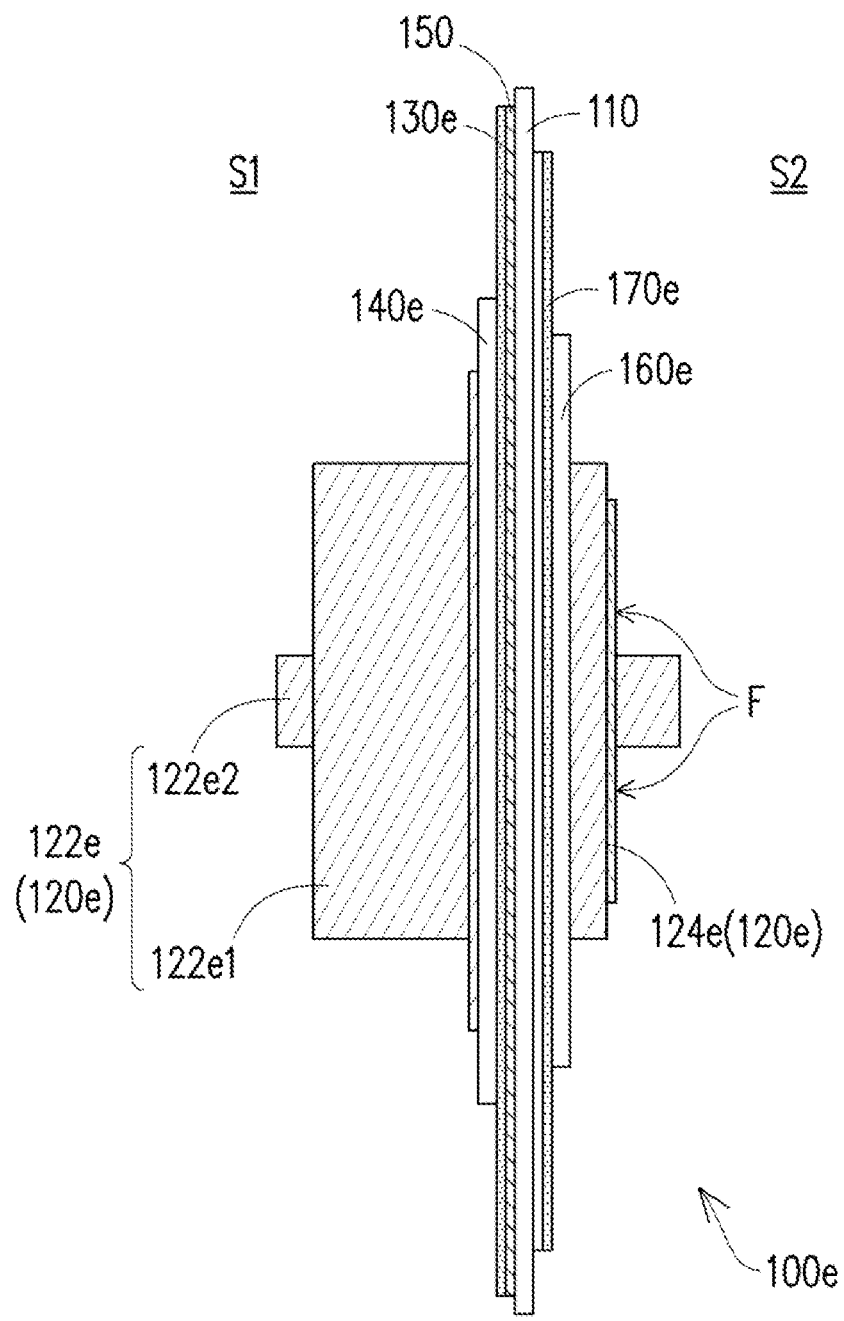
FIG. 6A is a schematic side view of a wavelength conversion module according to an embodiment of the invention.
Figure 6B:
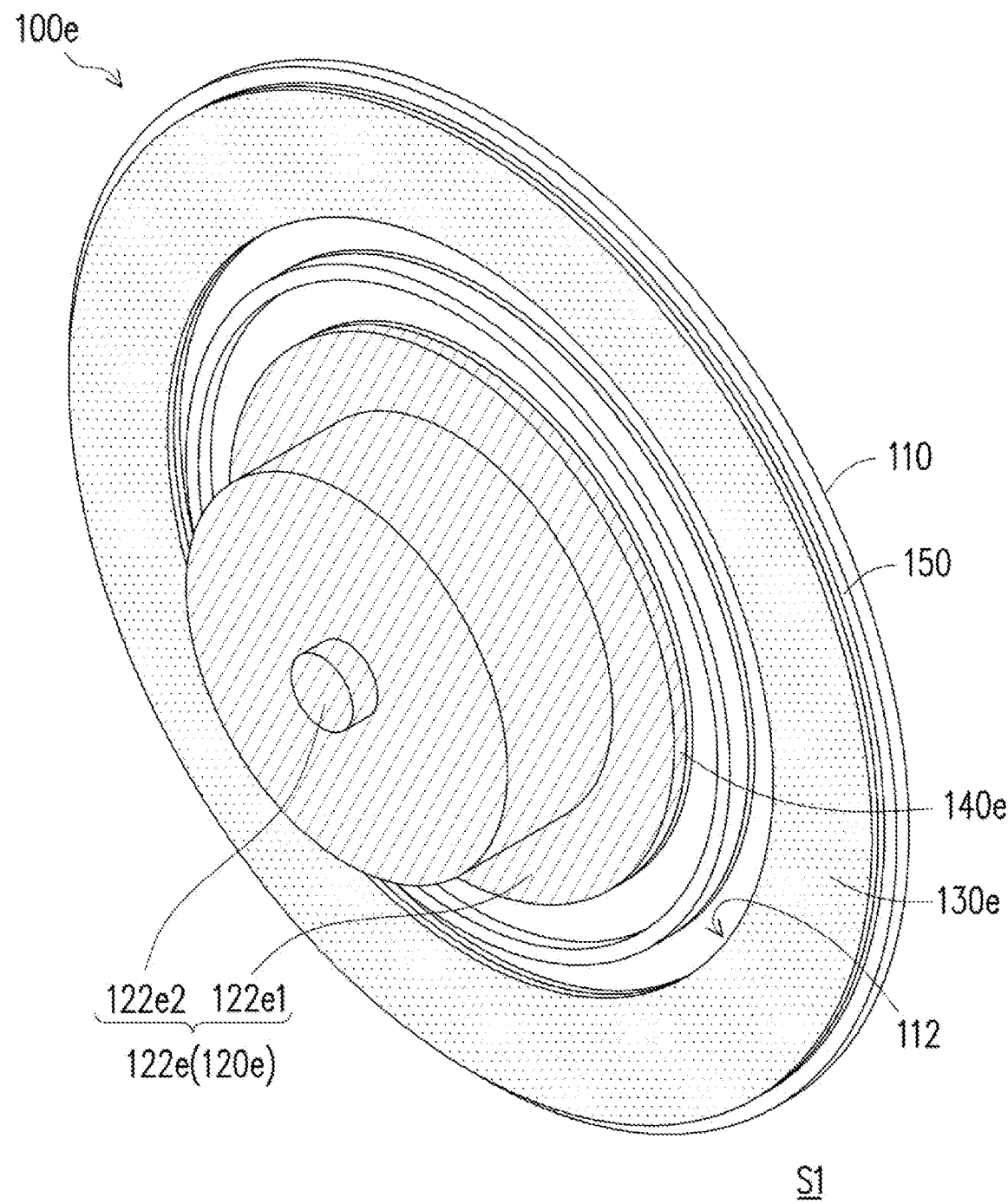
FIG. 6B is a schematic three-dimensional view of the wavelength conversion module of FIG. 6A from one perspective.
Figure 6C:
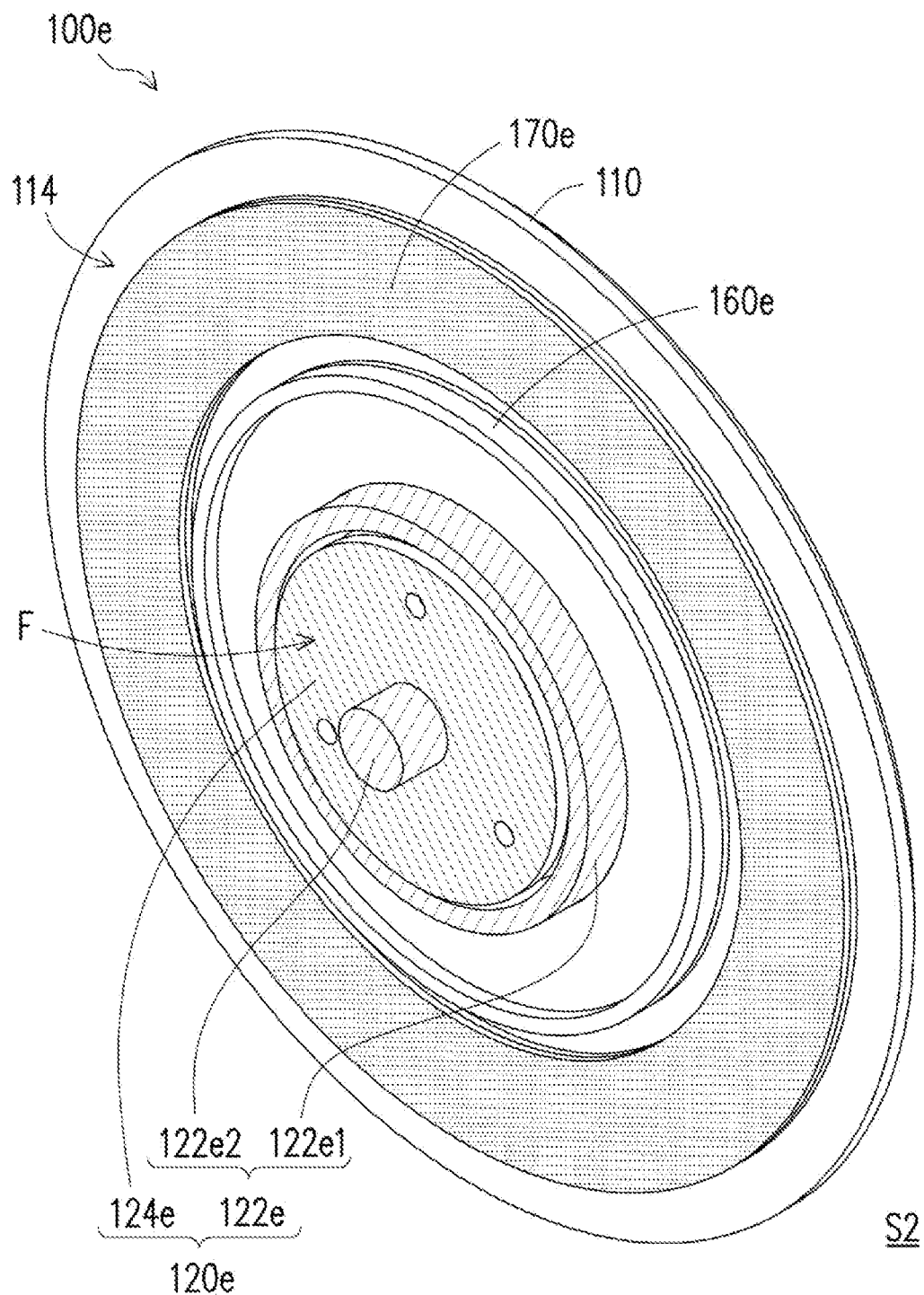
FIG. 6C is a schematic three-dimensional view of the wavelength conversion module of FIG. 6A from another perspective.
Figure 6D:
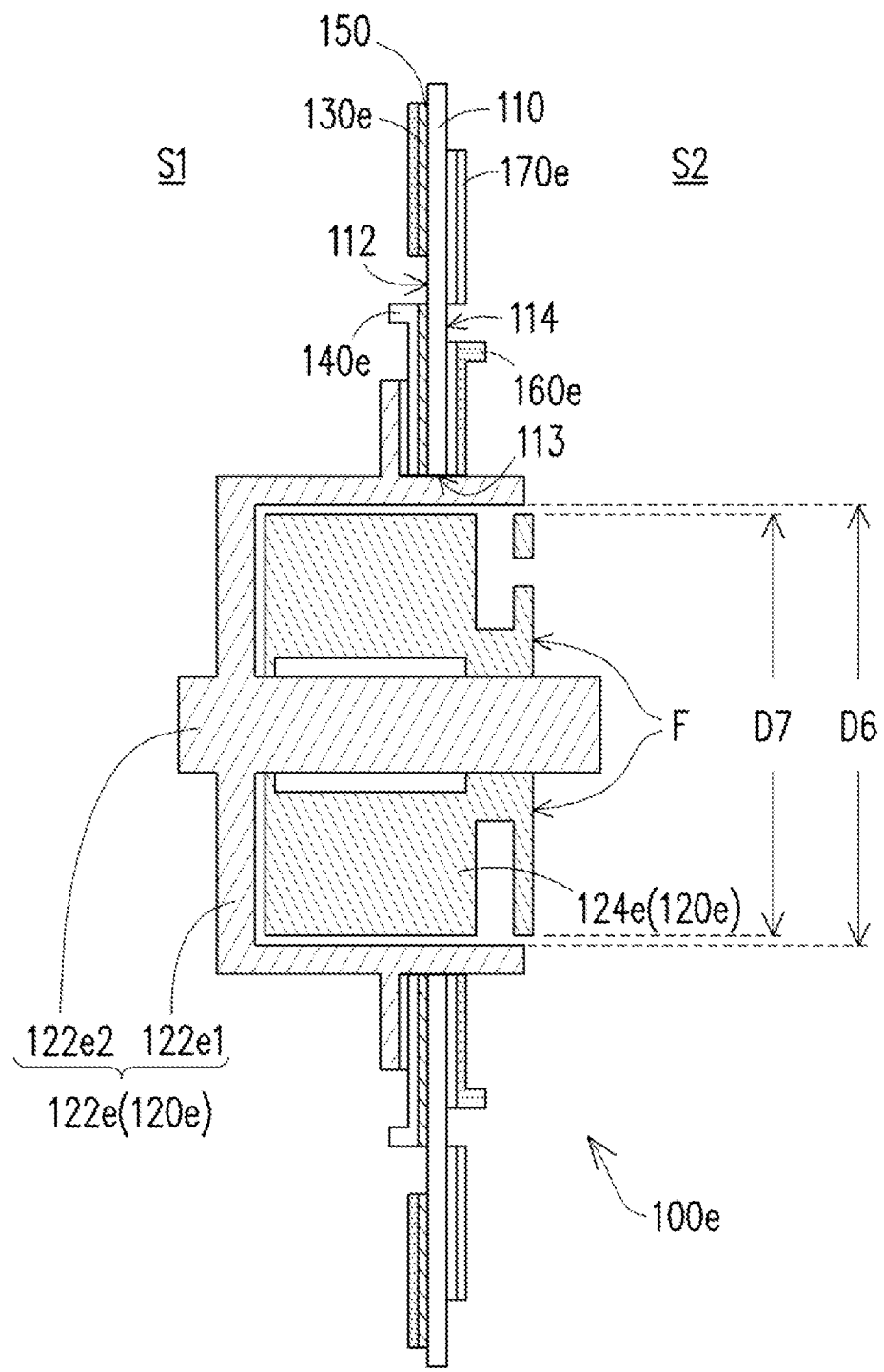
FIG. 6D is a schematic cross-sectional view of the wavelength conversion module of FIG. 6A.

FIG. 6A is a schematic side view of a wavelength conversion module according to an embodiment of the invention. FIG. 6B is a schematic three-dimensional view of the wavelength conversion module of FIG. 6A from one perspective. FIG. 6C is a schematic three-dimensional view of the wavelength conversion module of FIG. 6A from another perspective. FIG. 6D is a schematic cross-sectional view of the wavelength conversion module of FIG. 6A.

Referring to FIG. 6A, FIG. 6B, FIG. 6C, and FIG. 6D together, the optical processing turntable of the embodiment is substantially a wavelength conversion module 100e. In detail, the wavelength conversion module 100e of the embodiment includes a substrate 110, a first wavelength conversion layer 130e, a second wavelength conversion layer 170e, a first adjustment ring 140e, a second adjustment ring 160e, and a driver assembly 120e. The substrate 110 has a fixing hole 113 and a first side S1 and a second side S2 opposite to each other. The first wavelength conversion layer 130e is disposed on the first side S1 of the substrate 110, and the second wavelength conversion layer 170e is disposed on the second side S2 of the substrate 110. External dimensions of the first wavelength conversion layer 130e and the second wavelength conversion layer 170e may be the same or different. The first adjustment ring 140e is disposed on the first side S1 of the substrate 110, and the second adjustment ring 160e is disposed on the second side S2 of the substrate 110. External dimensions of the first adjustment ring 140e and the second adjustment ring 160e may be the same or different. The driver assembly 120e passes through the fixing hole 113 to be disposed on the substrate 110 to drive the substrate 110 to rotate. The driver assembly 120e has a locking surface F, and the locking surface F is located on the second side S2 of the substrate 110.

In addition, the driver assembly 120e of the embodiment includes a rotor 122e and a stator 124e. The rotor 122e includes a shaft sleeve 122e1 and a pivot 122e2. The pivot 122e2 penetrates through the shaft sleeve 122e1 from the first side S1 to the second side S2. The stator 124e has a locking surface F and is located in the shaft sleeve 122e1, and an outer diameter D7 of the locking surface F is less than or equal to an inner diameter D6 of the sleeve 122e1. In addition, the wavelength conversion module 100e of the embodiment further includes a reflective layer 150. The reflective layer 150 is disposed between the substrate 110 and the first wavelength conversion layer 130e.

Because the locking surface F on which the wavelength conversion module 100e is locked to an optical machine (not shown) of the embodiment is only disposed on the second side S2 of the substrate 110, the first wavelength conversion layer 130e and the first adjustment ring 140e are disposed on the first side S1 of the substrate 110, and the second wavelength conversion layer 170e and the second adjustment ring 160e are disposed on the second side S2 of the substrate 110, to cause structures on two opposite sides of the substrate 110 to be symmetrically or nearly symmetrically designed, so that the center of mass of the wavelength conversion module 100e is adjusted to an optimal position. In this way, when the wavelength conversion module 100e is in operation, vibration and noise due to structural imbalance may be avoided or reduced, further prolonging a service life of the driver assembly 120e of the wavelength conversion module 100e.

Based on the foregoing, the embodiments of the invention have at least one of the following advantages or effects. In the optical processing turntable of the invention, the two locking surfaces of the driver assembly are respectively located on the first side and the second side of the substrate opposite to each other, so that the center of mass of the optical processing turntable is located between the two locking surfaces, thereby achieving structure balance and dynamic balance. Therefore, when the optical processing turntable is in operation, vibration and noise may be effectively reduced due to the dynamic balance, and the service life of the driver assembly may further be improved. In this way, in the projection apparatus using the optical processing turntable provided by the invention, noise generated by structural vibration may be effectively reduced, and a prolonged service life is provided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical processing turntable, comprising: a substrate and a driver assembly, wherein
   the substrate has a fixing hole and a first side and a second side opposite to each other, and
   the driver assembly passes through the fixing hole to be disposed on the substrate to drive the substrate to rotate, wherein the driver assembly has two locking surfaces, and the two locking surfaces are respectively located on the first side and the second side of the substrate.

2. The optical processing turntable according to claim 1, wherein the driver assembly comprises a rotor and a stator, the rotor comprises a shaft sleeve, a pivot, and a partition plate, the partition plate divides the shaft sleeve into two accommodating regions in a direction parallel to the substrate, the pivot penetrates through the partition plate from the first side to the second side and is located in the shaft sleeve, the stator respectively comprises two stator portions, the two stator portions have the two locking surfaces and are disposed in the two accommodating regions, and the two locking surfaces are adjacent to two opposite ends of the shaft sleeve.

3. The optical processing turntable according to claim 2, further comprising:
   a wavelength conversion layer, wherein the substrate has a first surface and a second surface opposite to each other, and the wavelength conversion layer is disposed on the first side of the substrate and is located on the first surface.

4. The optical processing turntable according to claim 3, further comprising:
   an adjustment ring, disposed on the second side of the substrate and located on the second surface.

5. The optical processing turntable according to claim 4, wherein the two locking surfaces are located in the shaft sleeve and have a same outer diameter, and the outer diameter is less than or equal to an inner diameter of the shaft sleeve.

6. The optical processing turntable according to claim 5, further comprising:
   an auxiliary adjustment ring, disposed on the first side of the substrate and located on the first surface.

7. The optical processing turntable according to claim 6, wherein external dimensions of the adjustment ring and the auxiliary adjustment ring are identical or are different.

8. The optical processing turntable according to claim 5, further comprising:
   an auxiliary wavelength conversion layer, disposed on the second side of the substrate and located on the second surface.

9. The optical processing turntable according to claim 8, wherein external dimensions of the wavelength conversion layer and the auxiliary wavelength conversion layer are identical or are different.

10. The optical processing turntable according to claim 4, wherein the two locking surfaces are respectively a first locking surface disposed on the first side and a second locking surface disposed on the second side, the first locking surface is located outside the shaft sleeve and has a first outer diameter, the second locking surface is located in the shaft sleeve and has a second outer diameter, the first outer diameter is greater than an inner diameter of the shaft sleeve, and the second outer diameter is less than or equal to the inner diameter of the shaft sleeve.

11. The optical processing turntable according to claim 10, wherein the rotor further comprises a groove structure disposed on the first side of the substrate, connected to a periphery of the shaft sleeve, and located on the first surface.

12. The optical processing turntable according to claim 4, further comprising:
   a reflective layer, disposed between the substrate and the wavelength conversion layer.

13. The optical processing turntable according to claim 1, wherein the substrate comprises a phosphor wheel substrate, a color filter wheel substrate, or a diffusion wheel substrate.

14. A wavelength conversion module, wherein the wavelength conversion module comprises a substrate, a first wavelength conversion layer, a second wavelength conversion layer, a first adjustment ring, a second adjustment ring, and a driver assembly, wherein
   the substrate has a fixing hole and a first side and a second side opposite to each other,
   the first wavelength conversion layer is disposed on the first side of the substrate,
   the second wavelength conversion layer is disposed on the second side of the substrate, the first adjustment ring is disposed on the first side of the substrate, the second adjustment ring is disposed on the second side of the substrate, and the driver assembly passes through the fixing hole to be disposed on the substrate to drive the substrate to rotate, wherein the driver assembly has a locking surface, and the locking surface is located on the second side of the substrate.

15. The wavelength conversion module according to claim 14, wherein the driver assembly comprises a rotor and a stator, the rotor comprises a shaft sleeve and a pivot, the pivot penetrates through the shaft sleeve from the first side to the second side, the stator has the locking surface and located in the shaft sleeve, and an outer diameter of the locking surface is less than or equal to an inner diameter of the shaft sleeve.

16. The wavelength conversion module according to claim 14, further comprising:
a reflective layer, disposed between the substrate and the first wavelength conversion layer.

17. The wavelength conversion module according to claim 14, wherein external dimensions of the first wavelength conversion layer and the second wavelength conversion layer are identical or are different.

18. The wavelength conversion module according to claim 14, wherein external dimensions of the first adjustment ring and the second adjustment ring are identical or are different.

19. A projection apparatus, comprising: a light source module, an optical processing turntable, a light valve, and a projection lens, wherein the light source module is configured to emit a light beam, the optical processing turntable is disposed on a transmission path of the light beam and comprises a substrate and a driver assembly, wherein the substrate has a fixing hole and a first side and a second side opposite to each other, and the driver assembly passes through the fixing hole to be disposed on the substrate to drive the substrate to rotate, wherein the driver assembly has two locking surfaces, and the two locking surfaces are respectively located on the first side and the second side of the substrate, the light valve is disposed on the transmission path of the light beam and is configured to convert the light beam into an image beam, and the projection lens is disposed on a transmission path of the image beam and is configured to convert the image beam into a projection beam.

20. A projection apparatus, comprising: a light source module, a wavelength conversion module, a light valve, and a projection lens, wherein the light source module is configured to emit a light beam, the wavelength conversion module is disposed on a transmission path of the light beam and comprises a substrate, a first wavelength conversion layer, a second wavelength conversion layer, a first adjustment ring, a second adjustment ring, and a driver assembly, wherein the substrate has a fixing hole and a first side and a second side opposite to each other, the first wavelength conversion layer is disposed on the first side of the substrate, the second wavelength conversion layer is disposed on the second side of the substrate, the first adjustment ring is disposed on the first side of the substrate, the second adjustment ring is disposed on the second side of the substrate, and the driver assembly passes through the fixing hole to be disposed on the substrate to drive the substrate to rotate, wherein the driver assembly has a locking surface, and the locking surface is located on the second side of the substrate, the light valve is disposed on the transmission path of the light beam and is configured to convert the light beam into an image beam, and the projection lens is disposed on a transmission path of the image beam and is configured to convert the image beam into a projection beam.

* * * * *